No. 669,182. Patented Mar. 5, 1901.
R. J. REYNOLDS.
APPARATUS FOR ELEVATING AND CLEANING SEED COTTON.
(Application filed July 5, 1900.)
(No Model.)

Witnesses

Inventor
R. J. Reynolds
by H. B. Willson & Co.
Attorneys

UNITED STATES PATENT OFFICE.

RICHARD J. REYNOLDS, OF TAYLOR, TEXAS.

APPARATUS FOR ELEVATING AND CLEANING SEED-COTTON.

SPECIFICATION forming part of Letters Patent No. 669,182, dated March 5, 1901.

Application filed July 5, 1900. Serial No. 22,553. (No model.)

*To all whom it may concern:*

Be it known that I, RICHARD J. REYNOLDS, a citizen of the United States, residing at Taylor, in the county of Williamson and State of Texas, have invented certain new and useful Improvements in Apparatus for Elevating and Cleaning Seed-Cotton; and I do declare the following to be a full, clear, and exact description of the invention, such as will enable others skilled in the art to which it appertains to make and use the same.

The invention relates to an apparatus for elevating and cleaning seed-cotton.

The object of the invention is to provide the suction-pipe with a trap having automatically-operating valves, whereby the seed-cotton as it is fed to the gin by the suction of an exhaust-fan will be liberated from dirt, rocks, and all heavy foreign matter, which will drop into said trap and in being discharged therefrom will automatically operate a valve to close the communication between the trap and the suction-pipe, and thereby prevent the breaking of the vacuum or suction in said pipe, and thus permit of the continuous and uninterrupted feed of the seed-cotton to the gin.

With this and other objects in view the invention consists in certain features of construction and combination of parts, which will be hereinafter fully set forth.

Figure 1:
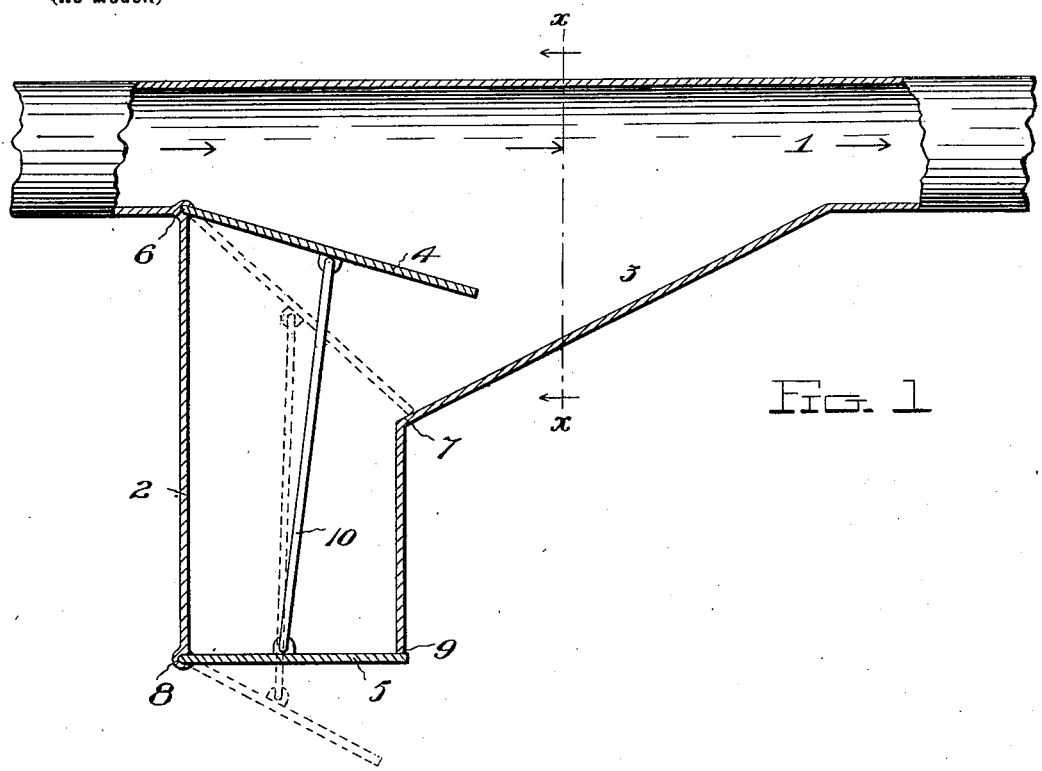
Figure 2:
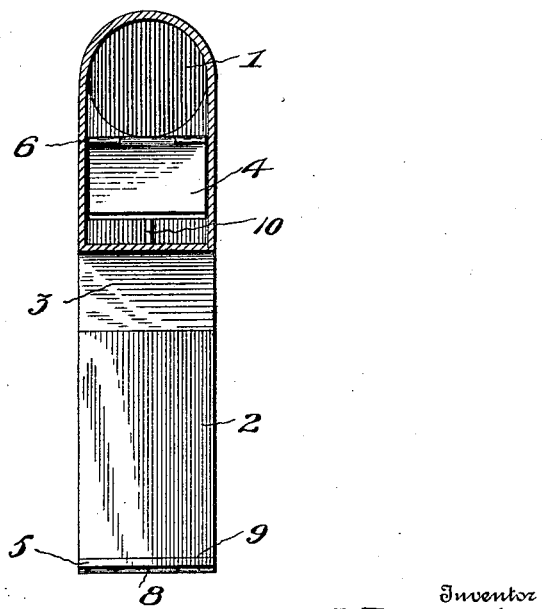

In the accompanying drawings, Figure 1 is a longitudinal sectional view, and Fig. 2 is a cross-sectional view on line $x$ $x$ of Fig. 1 looking in the direction of the arrow.

Referring to the drawings, 1 denotes a suction-pipe leading from a wagon or other source of seed-cotton supply to a cotton-gin. The suction for drawing the seed-cotton through this pipe to the gin is maintained by an ordinary exhaust-fan, which, forming no part of my invention, is not illustrated. Arranged between the inlet and outlet ends of the suction-pipe is a trap 2, which communicates with the suction-pipe. The trap projects downwardly from the suction-pipe and is provided with an inclined trough-like extension 3.

4 denotes the upper valve, and 5 the lower valve. The upper valve is hinged at the point 6 to the upper end of the trap and is adapted to close communication between the suction-pipe and the trap by having its free end seated at the point 7 at the lower end of the inclined trough. The lower valve is hinged at the point 8 to the lower end of the trap and is adapted to close said lower end by seating thereagainst at the point 9.

10 denotes a link pivotally connecting the valves 4 and 5 together and of such length that when the valve 5 is seated the valve 4 will be unseated, and vice versa.

In operation the suction in the pipe 1 will normally hold the valve 4 open and the valve 5 closed. As the seed-cotton is drawn through the pipe 1 and over the upper end of the trap foreign matter—such as dirt, rocks, and the like—which is in the seed-cotton will by specific gravity fall upon the upper surface of the valve and the floor of the trough-like extension 3 and will roll down into the trap. When the accumulation of this foreign matter within the trap has reached that point where the weight thereof overcomes the suction within the pipe, the valve 5 will swing downward and discharge the foreign matter from the trap. In its movement downward the valve 5 by reason of its connection with the valve 4 will close said valve, and thereby permit the suction through said pipe to continue uninterruptedly. The instant the foreign matter has been discharged from the trap the suction through the pipe will unseat and raise the valve 4 and seat the valve 5, and all foreign matter which was liberated from the cotton at the instant the valve 4 closed and the valve 5 opened will roll off of the inclined bottom of the trough-like extension 3 into the trap 2.

From the foregoing description, taken in connection with the accompanying drawings, the construction, operation, and advantages of my invention will be readily understood without requiring an extended explanation. The device is exceedingly useful for the purpose for which it is designed and may be placed upon the market at a comparatively small cost.

Various changes in the form, proportion, and the minor details of construction may be resorted to without departing from the principle or sacrificing any of the advantages of the invention.

Having thus fully described the invention, what is claimed, and desired to be secured by Letters Patent, is—

1. The combination with a suction-pipe, of a trap communicating therewith at a point in its length between the point of admission of the material to and its discharge from said pipe, a valve for the outlet of said trap and a valve for the inlet to said trap, means connecting said valves so that they operate simultaneously and automatically to open the outlet and close the inlet of said trap to discharge the foreign matter collected by said trap and at the same time maintain a vacuum in the suction-pipe, thereby permitting a continuous movement of the material therethrough, substantially as set forth.

2. The combination with a suction-pipe, of a trap communicating therewith at a point intermediate its inlet and discharge ends, a trough-like extension leading from said trap to, and communicating with, the suction-pipe, a valve for the inlet to said trap and a valve for the outlet of said trap, and means for connecting the valves whereby the opening of one will close the other, substantially as set forth.

In testimony whereof I have hereunto set my hand in presence of two subscribing witnesses.

RICHARD J. REYNOLDS.

Witnesses:
J. S. JONES,
JOHN LLOYD.